(12) United States Patent
Coots

(10) Patent No.: US 7,406,919 B2
(45) Date of Patent: Aug. 5, 2008

(54) METHOD AND APPARATUS FOR OPERATING A VEHICLE ON RAILS OF A RAILROAD TRACK WITH AN AUXILIARY DRIVE ASSEMBLY

(76) Inventor: William R. Coots, 2628 Belmont Rd., Lebanon Junction, KY (US) 40150

( * ) Notice: Subject to any disclaimer, the term of this patent is extended or adjusted under 35 U.S.C. 154(b) by 261 days.

(21) Appl. No.: 11/264,375

(22) Filed: Nov. 2, 2005

(65) Prior Publication Data

US 2007/0095248 A1   May 3, 2007

(51) Int. Cl.
*B61F 13/00*   (2006.01)
(52) U.S. Cl. ...................... 105/215.2; 104/154
(58) Field of Classification Search ............... 104/154; 105/72.2, 215.1, 215.2
See application file for complete search history.

(56) References Cited

U.S. PATENT DOCUMENTS

| | | | |
|---|---|---|---|
| 1,853,572 A | 4/1932 | Nugent | |
| 1,881,045 A | 10/1932 | Chapin | |
| 2,135,307 A | 11/1938 | Keator | |
| 2,541,514 A | 2/1951 | Herold | |
| 2,747,677 A | 5/1956 | Barfield | |
| 2,896,553 A | 7/1959 | Whisler | |
| 3,019,742 A * | 2/1962 | Kershaw | 105/72.2 |
| 3,198,137 A | 8/1965 | White, Jr. | |
| 3,516,576 A * | 6/1970 | Elliott | 222/622 |
| 3,599,814 A | 8/1971 | Brownfield | |
| 4,534,297 A * | 8/1985 | Johnson, Sr. | 105/72.2 |
| 4,828,452 A | 5/1989 | Bolitho | |
| 5,167,295 A | 12/1992 | Moog | |
| 6,352,035 B1 | 3/2002 | Kashiwase | |
| 6,807,909 B1 | 10/2004 | Coots | |
| 2005/0217532 A1* | 10/2005 | Conneally | 105/215.1 |

* cited by examiner

*Primary Examiner*—Lars A Olson
(74) *Attorney, Agent, or Firm*—James E. Cole; Middleton Reutlinger

(57) ABSTRACT

A method and apparatus for operating a vehicle to be driven on the road as well as railroad tracks includes an auxiliary drive suspended below a frame of the vehicle. The auxiliary drive includes a hydraulic roller assembly having a roller component for engaging a tire of a vehicle to be propelled. A hydraulic cylinder extends said roller component from a first, unengaged position to a second, engaged position. A hydraulic motor is operatively connected to a chain drive for driving said roller component so that said roller component rotates and imparts a corresponding rotary force to the tire of the vehicle. In operation, the vehicle is placed in neutral and the auxiliary drive is actuated. The auxiliary drive can be controlled at any location, thereby allowing the vehicle to be driven without a driver.

24 Claims, 6 Drawing Sheets

METHOD AND APPARATUS FOR OPERATING A VEHICLE ON RAILS OF A RAILROAD TRACK WITH AN AUXILIARY DRIVE ASSEMBLY

FIELD OF THE INVENTION

The invention relates to a method and apparatus for driving a vehicle on the road as well as railroad tracks. Specifically, the invention relates to a method and apparatus for driving a vehicle on railroad tracks with the use of an auxiliary drive assembly.

BACKGROUND OF THE INVENTION

In order to maintain the operability of a railroad track, frequent maintenance repairs are needed. To make these repairs, a vehicle that can be driven on conventional road surfaces, as well as railroad tracks, is ideal. This allows one truck to be driven to the site, which can also be used on the railroad track to make the necessary repairs. For example, most job sites are at inconvenient locations, and have no road access. Therefore, it is necessary for one vehicle to transport the materials and operators to the particular job site.

In order to make the requisite repairs, a piece of heavy duty equipment is mounted on the bed of the vehicle. However, many of the above-noted vehicles of the prior art must have at least two operators—one for driving the vehicle on the track and at least one for operating the heavy duty equipment. For example, when using a heavy duty crane, a first operator is needed to operate the heavy duty equipment and a second operator is needed to drive the truck, requiring undue labor costs. In addition, the first operator of the heavy duty equipment must advise the second operator when the vehicle should continue along the tracks, wasting additional time and expense. Accordingly, it would be desirable to provide a vehicle that requires one operator to control both the vehicle as well as auxiliary equipment needed to make repairs.

SUMMARY OF THE INVENTION

The present invention comprises an auxiliary drive assembly, including a hydraulic roller assembly having a roller component for engaging a tire of a vehicle to be propelled. A hydraulic cylinder moves the roller component from a first, unengaged position to a second, engaged position. A hydraulic motor is operatively connected to a chain drive for driving the roller component so that the roller component rotates and imparts a corresponding rotary force to the tire of the vehicle for thereby advancing the vehicle along the railroad rails.

The present invention also comprises a method of operating a vehicle. An auxiliary drive assembly is suspended below a frame of a vehicle to be driven and includes a roller component for engaging a tire of the vehicle. The vehicle is placed on railroad tracks so that tires of the vehicle engage the tracks. The roller component extends so that the roller component engages the tire, thereby rotating and imparting a corresponding rotary force to the tire of the vehicle.

The present invention also comprises a vehicle for driving on conventional road surfaces and railroad tracks, including a main chassis for supporting a vehicle body, tires including portions to be driven on rails of a railroad track, and a main engine for propelling the vehicle. An auxiliary drive is suspended below the body of the vehicle and includes a hydraulic roller assembly having a roller component for engaging a tire of a vehicle to be propelled. A hydraulic cylinder moves the roller component from a first, unengaged position to a second, engaged position. A hydraulic motor is operatively connected to a chain drive for driving the roller component so that the roller component rotates and imparts a corresponding rotary force to the tire of the vehicle.

BRIEF DESCRIPTION OF THE DRAWING FIGURE

Further features and characteristics of the present invention will become more apparent from the following detailed description considered with reference to the accompanying drawing figures.

DETAILED DESCRIPTION OF THE PREFERRED EMBODIMENT(S)

Figure 1:
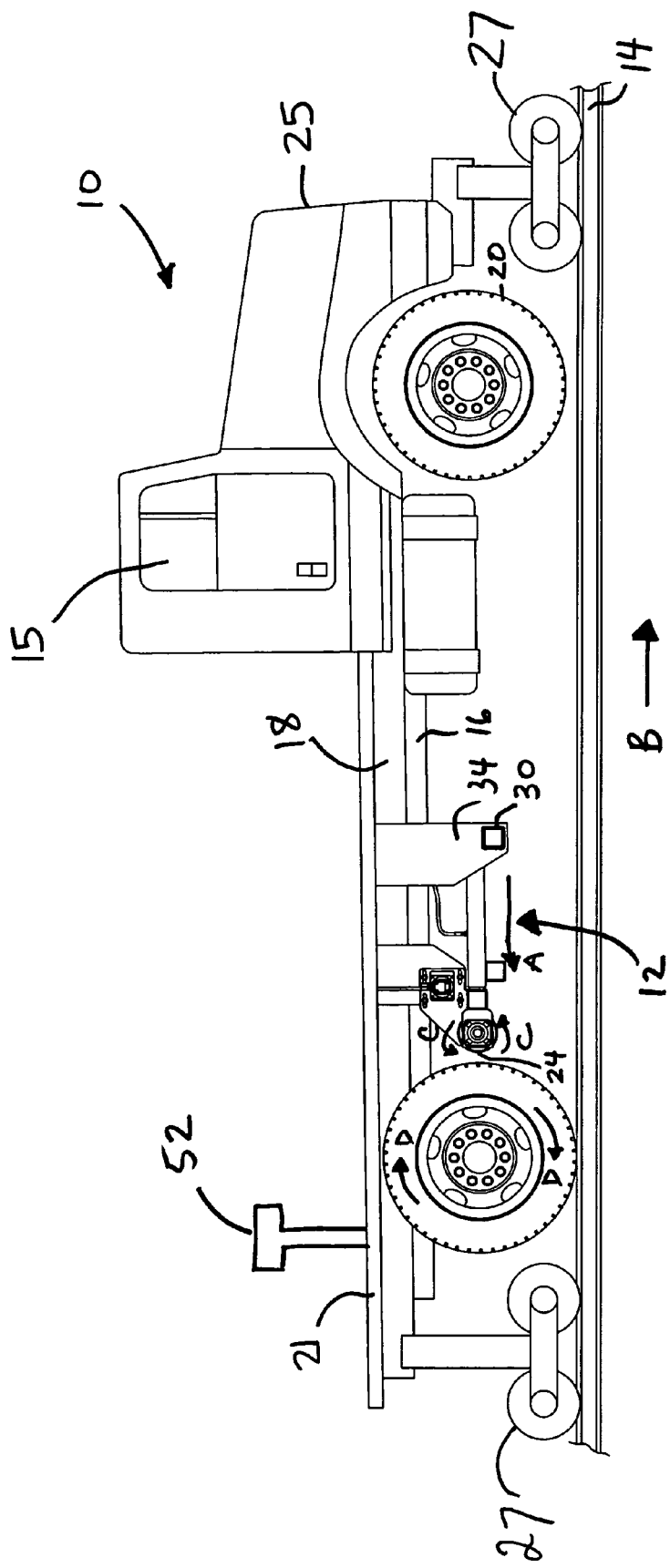
FIG. 1 is a side elevational view of a vehicle to be driven on railroad tracks having an auxiliary drive assembly of the present invention.

With reference to FIG. 1, a material-handling vehicle 10 for making repairs on railroad tracks is illustrated, which has the capability to operate on both conventional road surfaces as well as the rails of a railroad track. Preferably, the vehicle 10 is driven from an operator's cab 15 when driven over conventional road surfaces to different job sites. The vehicle 10 includes a main chassis 16 for supporting a vehicle body 18, and is provided with front tires 20 and two pair of twin rear tires 22, the rear tires typically driving the vehicle 10. A main vehicle engine powers the vehicle 10, and is typically located in the front cab 25 of the vehicle 10.

The vehicle 10 includes a truck bed 21 for supporting various types of heavy duty equipment needed for railroad repair or construction, such as a crane. The heavy duty equipment can be controlled from an operator's cab placed on top of the truck bed 21 (not shown). Preferably, the heavy duty equipment is powered by the vehicle engine. However, it should be understood that the heavy duty equipment may be powered by its own engine.

Figure 4:
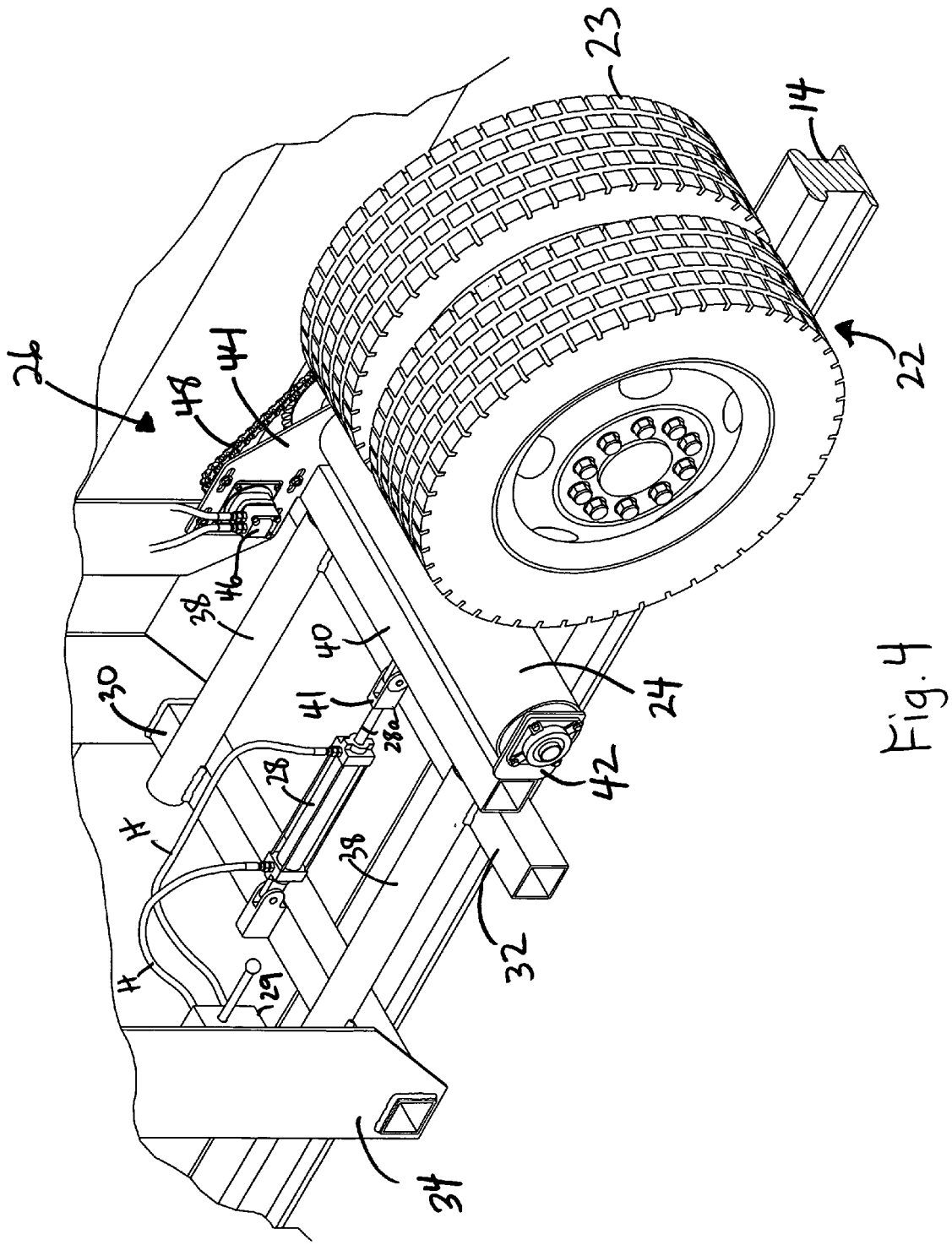
FIG. 4 is a perspective view of the auxiliary drive assembly of the present invention in a first, retracted position, where the roller component is not in contact with tires of the vehicle to be driven.
Figure 5:
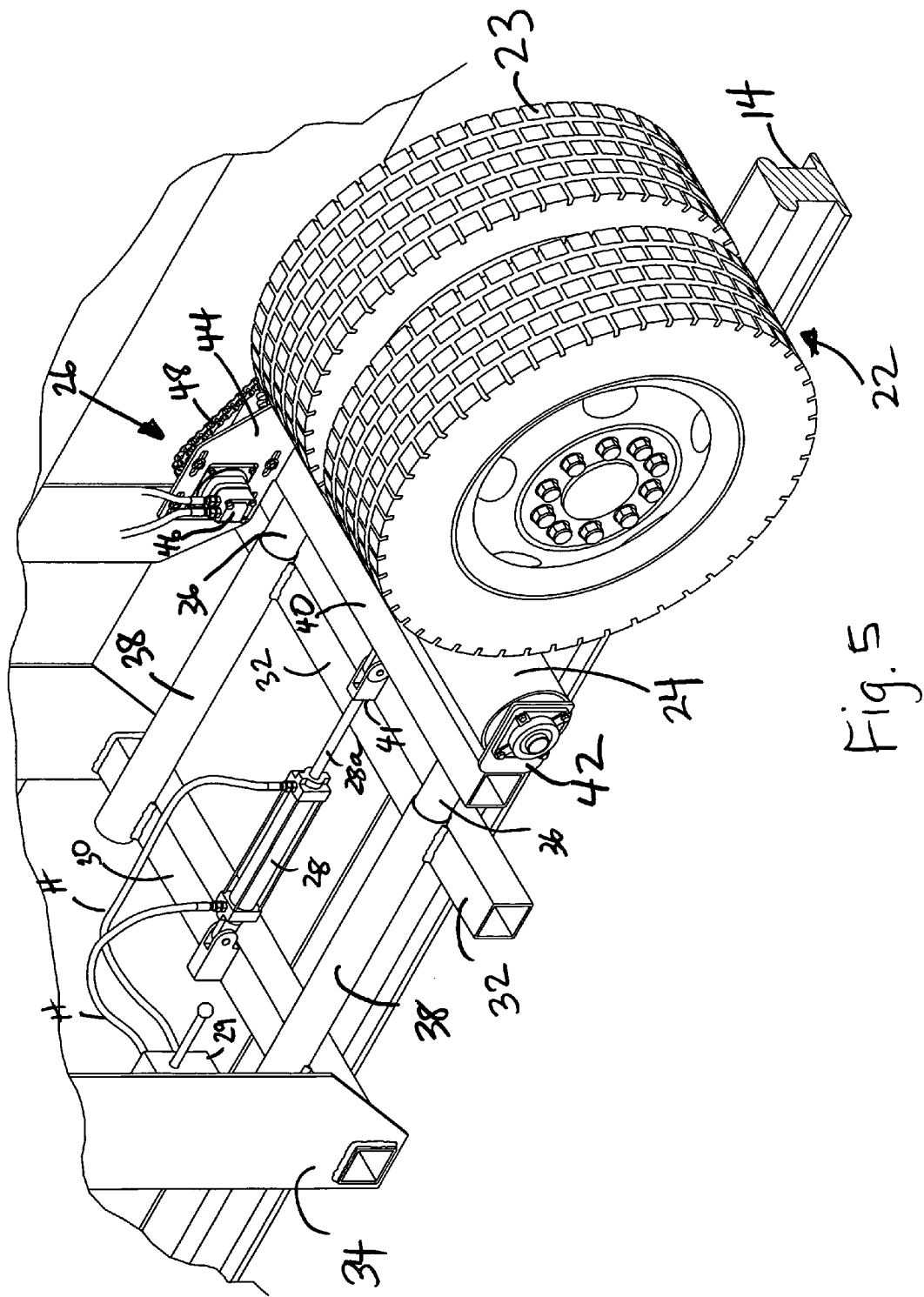
FIG. 5 is a perspective view of the auxiliary drive assembly of the present invention in a second, extended position, where the roller component is engaged with tires of the vehicle to be driven.

As discussed above, the tires 20, 22 of the vehicle 10 are configured to travel on both conventional road surfaces as well as in cooperation with the rails of a railroad track 14. In particular, as shown in FIGS. 4 and 5, each set of rear wheels 22 includes an inner wheel 23 that engages the rails 14 of the railroad track when the vehicle 10 is positioned on the tracks. Front wheels 20 preferably are positioned above the rails 14 of the railroad track, and railroad wheels 27, as best shown in FIG. 1, are moved from a retracted position to an extended position to engage the rails 14 at the rear and front of the vehicle 10. When the vehicle 10 is positioned on the rails 14 of the railroad track, the heavy duty equipment can be operated from the operator's cab placed on top of the truck bed. The vehicle 10 may be moved along the tracks via the operator's cab 15. However, an auxiliary drive assembly 12 may be actuated, which allows the vehicle to be driven by the operator of the heavy duty equipment. Those skilled in the art recognize that the railroad wheels 27 are extended, such as through operation of a cooperating hydraulicly operated cylinder and piston, to engage the railroad rails when the vehicle 10 is to be driven on the railroad tracks 14 and are retracted for on-road transit of vehicle 10. There is a pair of railroad wheels 27 proximate the front of vehicle 10, preferably operatively connected to the main chassis 16 and a pair of railroad wheels 27 proximate the rear of vehicle 10. Each set of railroad wheels 27 engages a corresponding rail 14, so that vehicle 10 will travel along the parallel rails 14 along the intended path.

The auxiliary drive assembly 12 includes a hydraulic roller assembly 26, which includes a roller component 24 for engaging the rear tires 22 of the vehicle 10 (shown in FIGS. 4 and 5). Preferably, the roller component 24 is made from a strong metal, such as steel or the like. However, it should be understood that roller component 24 may be made from any strong material, which allows the roller component 24 to engage and thereby rotate the wheels of vehicle 10. Once the roller component 24 engages the associated rear tire 22 of the vehicle, the roller component 24 is caused to rotate, thereby imparting a corresponding rotary force on the tire. This force causes the vehicle 10 to move in a desired direction.

With reference to FIG. 1, the auxiliary drive assembly 12 is preferably suspended below the vehicle body 18, where a first end of the auxiliary drive assembly 12 is secured to the vehicle frame, and the opposite end is secured to the hydraulic roller assembly 26. The auxiliary drive assembly can be placed on either side of the truck below the vehicle body 18, positioned adjacent either set of rear tires 22, or both.

Figure 2:
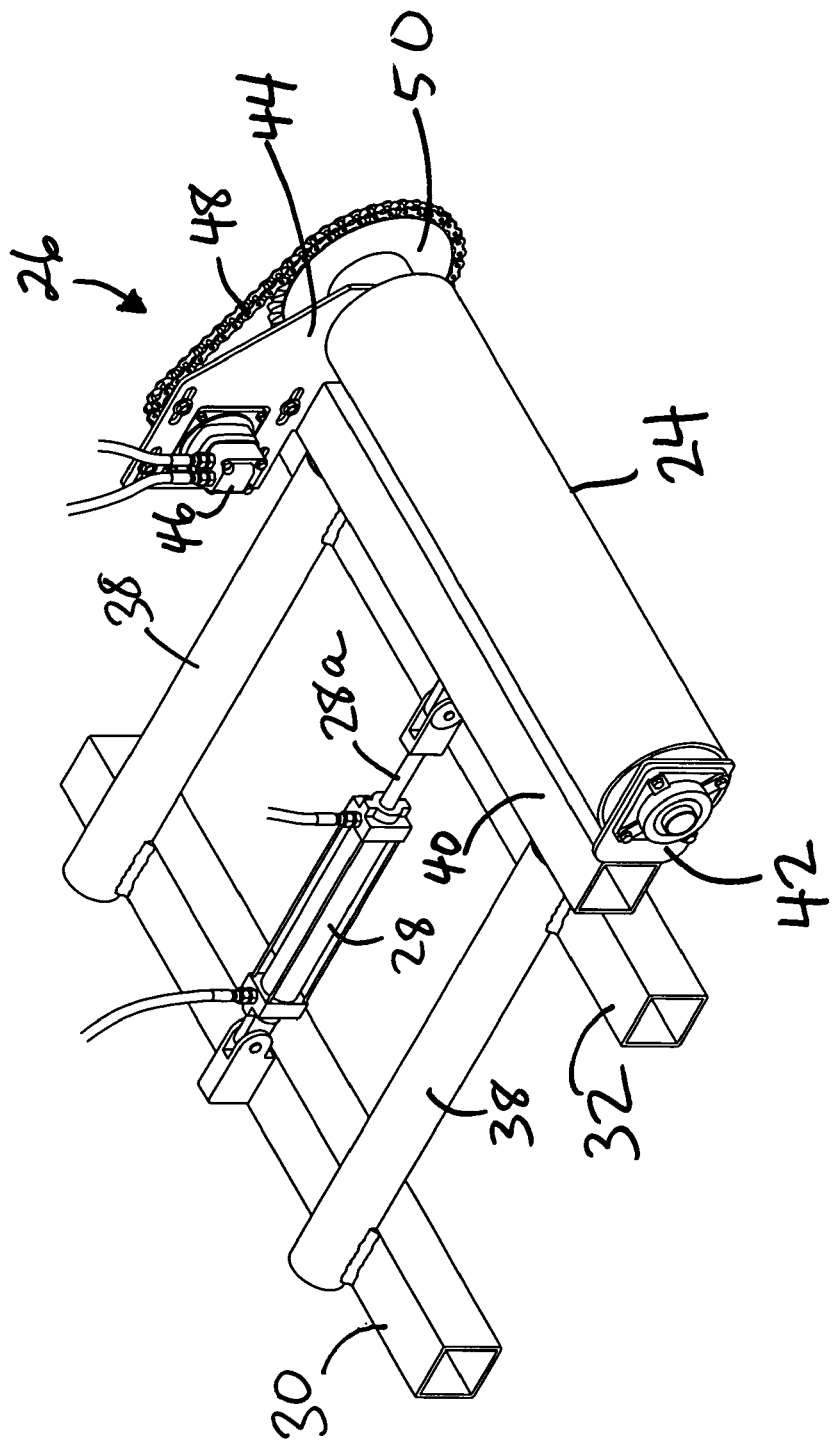
FIG. 2 is a perspective view of the auxiliary drive assembly of the present invention in a first, retracted position.
Figure 3:
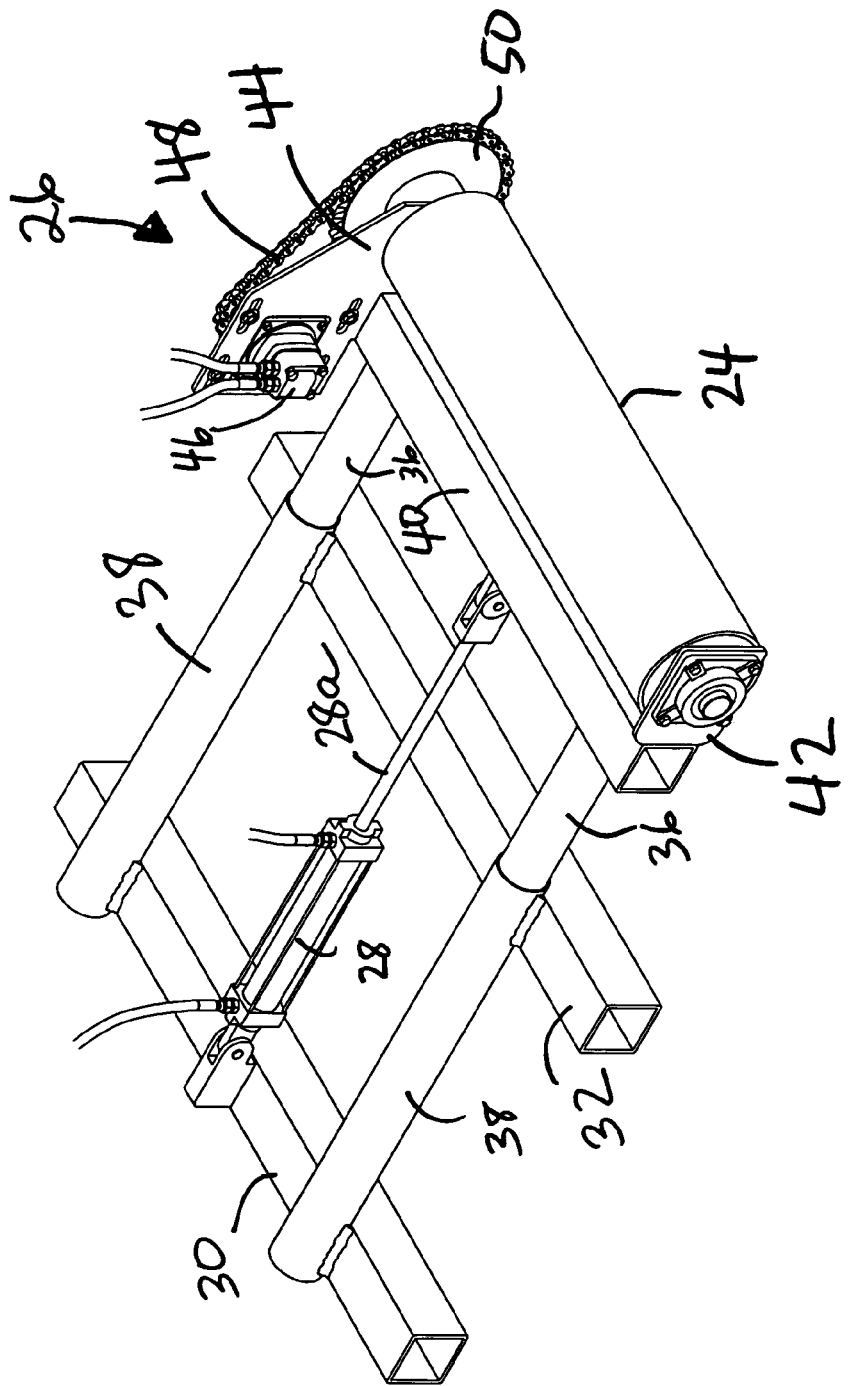
FIG. 3 is a perspective view of the auxiliary drive assembly of the present invention in a second, extended position.

With reference to FIGS. 2-5, the auxiliary drive assembly 12 includes a hydraulic cylinder 28 for moving the roller component 24 from a first, unengaged position as shown in FIGS. 2 and 4, to a second, engaged position as shown in FIGS. 3 and 5. The hydraulic cylinder 28 is of conventional design. Preferably, the hydraulic cylinder 28 is positioned between first and second mounting brackets 30, 32.

With reference to FIGS. 4 and 5, the hydraulic cylinder 28 is controlled by a hydraulic flow control valve 29. In particular, the hydraulic cylinder 28 is connected to the hydraulic flow control valve 29 via hydraulic hoses H. The hydraulic flow control valve 29 operates in a conventional manner, and causes the piston 28a of the hydraulic cylinder 28 to extend and retract upon actuation. The hydraulic flow control valve 29 is located near the auxiliary drive assembly 12 for simplicity, but may be placed at any convenient location, such as near the operator of the heavy duty equipment.

With reference to FIGS. 2-5, the support structure of the auxiliary drive assembly 12 will be described in more detail below. In particular, the first mounting bracket 30 is adapted to be attached to a mounting plate 34 (as shown in FIGS. 4 and 5), which is then secured to a frame of the vehicle 10 (as shown in FIG. 1). Preferably, mounting plates 34 are provided on both ends of the first mounting bracket 30, and are secured by welding, brazing or the like. Similarly, the mounting plates 34 may be secured to the vehicle body or frame by welding, brazing or the like. However, it should be understood that more or less than two mounting plates 34 may be used, depending on application and design preference. In addition, mounting plates 34 may secured in other ways, such as by mechanical connections via screws, bolts and the like. Likewise, mounting plates may be secured at ends of the second mounting bracket 32 and then attached to the vehicle to provide further support (not shown).

Preferably, a pair of tubular slider arms 36 is disposed between the first and second pair of mounting brackets 30, 32. Each of the slider arms 36 is positioned within a respective tubular slider housing 38, and are attached at their ends to a cross mounting bracket 40 (see FIGS. 3 and 5). The piston 28a is preferably pivotally connected at 41 to cross mounting bracket 40 in order to permit vertical movement in response to movement of wheels 22 as may occur due to debris and like materials disposed adjacent the railroad track rails. The slider arms 36 are positioned on either side of the hydraulic cylinder 28, and provide additional support to the device when the hydraulic cylinder 28 is actuated. In particular, when the hydraulic cylinder 28 extends from a first, retracted position, to a second, extended position, the slider arms 36 move in unison, thereby retracting and extending, respectively. Preferably, the slider housings 38 are secured to the mounting brackets 30, 32 by welding, brazing or the like. However, the slider housings 38 may be attached to the mounting brackets 30, 32 in any other way, such as by mechanical connections via screws, bolts and the like.

Preferably, distal ends of the slider arms 36 are fixedly secured to a cross mounting bracket 40, by welding, screws, or other suitable securing means. The cross mounting bracket 40 extends parallel to the first and second mounting brackets 30, 32, and is fixed at its ends to the hydraulic roller assembly 26 in at least two locations, by welding, brazing or the like. For example, in the preferred embodiment, the cross mounting bracket 40 is welded onto plates 42 and 44. The plates 42 and 44 are secured to ends of the roller component 24, so that the roller component 24 is allowed to rotate therebetween. However, it should be understood that the cross mounting bracket 40 may be secured to the roller component 24 in other ways, such as by mechanical connections, screws, bolts, and the like.

The auxiliary drive assembly 12 also includes a separate hydraulic motor 46 for causing the roller component 24 to rotate once it has made contact with the tire 22. In particular, a hydraulic motor 46 is operatively connected to a chain drive 48 for driving the roller component 24 so that the roller component 24 rotates and imparts a corresponding rotary force to the tire of the vehicle. The hydraulic motor 46 operates in a conventional manner. The chain drive 48 is affixed between two corresponding gears—a first gear 50 which is attached to the roller component 24 and a second gear affixed to an output end of the hydraulic motor 46 (not shown).

Preferably, the hydraulic motor 46 operating the chain drive 48 is variable so that speed and direction can be adjusted as necessary. In addition, the hydraulic motor 46 preferably operates as a function of the vehicle motor, which runs continuously in order to also supply power to the heavy duty equipment, such as a crane. Preferably, the control unit for the hydraulic motor is located near or adjacent the heavy duty equipment, such that the operator of the heavy duty equipment may also operate the auxiliary drive assembly 12. For example, as shown in FIG. 1, a control unit 52 may be placed on top of the truck bed 21, and in a location convenient by the operator of the heavy duty equipment. This eliminates the need for a second operator to drive the vehicle along the tracks. While I prefer the use of chain drive 48 for rotating the roller component 24, those skilled in the art will recognize that other drives may be utilized for causing rotation of roller component 24.

With reference as in FIG. 1, operation of the auxiliary drive assembly 12 will be discussed in more detail below. In particular, the vehicle 10 is placed on rails of a railroad track so that tires 22 of the vehicle 10 engage the tracks along a portion of the rear tire 23. The vehicle 10 is then placed in neutral. The hydraulic flow control valve 29 is then actuated (shown in FIGS. 4 and 5), which causes the roller component 24 to extend towards the rear tire 22 in direction A, thereby engaging a rear tire 22 of the vehicle 10. Once the roller component 24 contacts the rear tire 22, the hydraulic motor 46 is actuated.

As discussed above, preferably, the hydraulic motor 46 is actuated by the control unit 52 contained adjacent the heavy duty equipment, such that the operator of the heavy duty equipment may also actuate the auxiliary drive assembly 12. Once the hydraulic motor 46 is actuated, it causes a chain drive 48 to rotate, thereby also causing the roller component 24 to rotate in a counterclockwise direction C. The roller component 24 imparts a corresponding rotary force to the tire 22 of the vehicle so that the tire 22 rotates in a clockwise direction D, thereby propelling the vehicle in the direction of arrow B. The control unit 52 preferably includes controls for moving the vehicle 10 in a forward or backward direction. For example, the roller component 24 can be rotated in a clockwise direction, which causes the tire to rotate in a counterclockwise direction, thereby moving the vehicle in a backward direction. Likewise, controls are provided for varying the speed of variable speed hydraulic motor 46, for thereby regulating the speed of rotation of roller component 24 and thus of vehicle 10.

Figure 6:
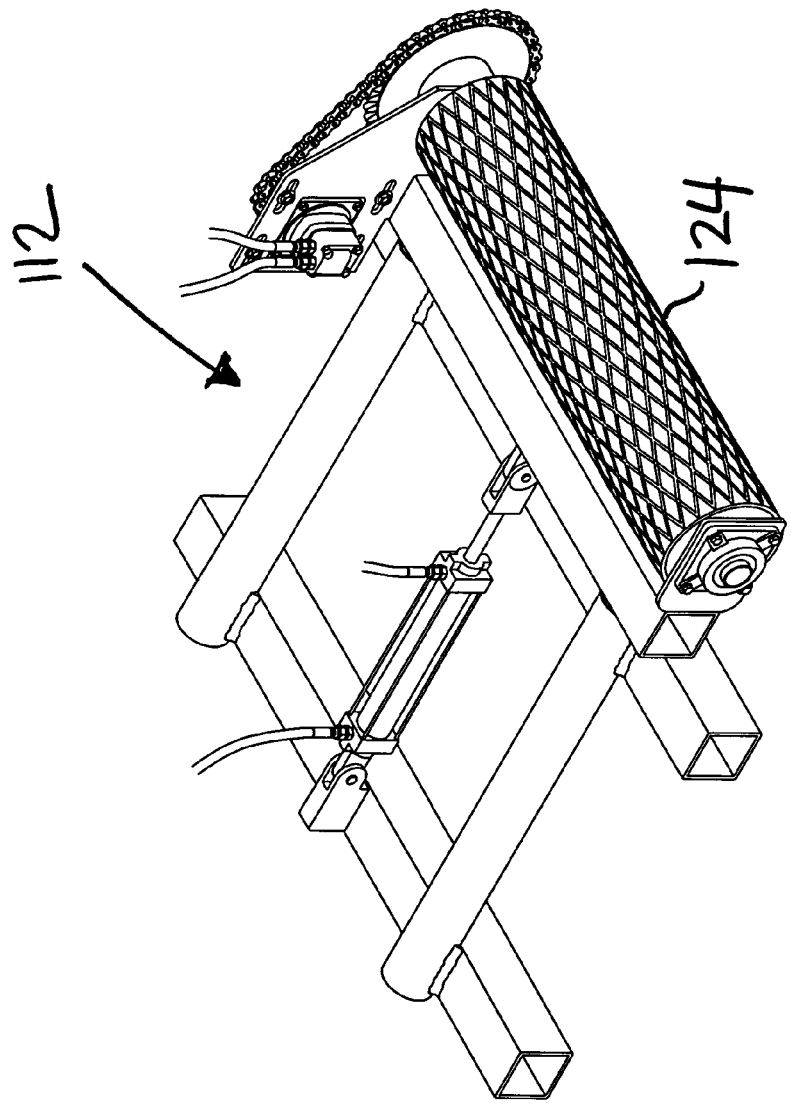
FIG. 6 is a perspective view of an alternative embodiment of the roller component of the auxiliary drive assembly of the present invention.

With reference to FIG. 6, an alternative embodiment of the auxiliary drive assembly 112 of the present invention is illustrated. In particular, the auxiliary drive assembly 112 is identical to the auxiliary drive assembly 12 shown in FIGS. 2-5, except that the roller component 124 is a grooved cylindrical drum. Like roller component 24, the drum 124 is preferably made of a durable metal, such as steel or the like. The grooved surface provides a stronger grip between the tire and drum.

It is understood that while various preferred designs have been used to describe this invention, the invention is not limited to the illustrated and described features. Modifications, usages and/or adaptations following the general principles disclosed herein are included in the present invention, including such departures that come within known or customary practice in the art to which this invention pertains. The present invention is intended to encompass all such departures having the central features set forth above, without departing from the scope and spirit of the invention, and which fall within the scope of the appended claims.

I claim:

1. An auxiliary drive assembly, comprising:
    a hydraulic roller assembly including a roller component for engaging a tire of a vehicle to be propelled;
    a hydraulic cylinder for moving said roller component from a first, unengaged position to a second, engaged position; and
    a motor operatively connected to said roller component so that said roller component rotates and imparts a corresponding rotary force to the tire of the vehicle; and
    wherein said motor is a hydraulic motor and is powered by an engine of the vehicle to be propelled.

2. The auxiliary drive assembly of claim 1, wherein a first end of the drive assembly is attached to a frame of the vehicle to be driven and a second end is attached to said hydraulic roller assembly.

3. The auxiliary drive assembly of claim 1, wherein said roller component is a grooved cylindrical drum for engaging rear tires of a vehicle to be driven.

4. The auxiliary drive assembly of claim 1, wherein said hydraulic motor is variable so that speed and direction can be adjusted.

5. The auxiliary drive assembly of claim 1, wherein said hydraulic cylinder is disposed between two mounting brackets.

6. The auxiliary drive assembly of claim 1, further comprising a hydraulic flow control valve for controlling extension and retraction of the piston of said hydraulic cylinder.

7. The auxiliary drive assembly of claim 1, wherein a control unit is disposed at a position accessible by an operator of heavy duty equipment.

8. A method of operating a vehicle, comprising the steps of:
    providing an auxiliary drive assembly suspended below a frame of a vehicle to be driven including a roller component for engaging a tire of the vehicle;
    placing the vehicle on railroad tracks so that tires of the vehicle engage the tracks; and
    extending the roller component so that the roller component engages the tire;
    rotating the roller component so that the roller component imparts a corresponding rotary force to the tire of the vehicle.

9. The method of claim 8, including the step of:
    placing the vehicle in neutral prior to the step of extending the roller component.

10. The method of claim 8, including the step of rotating the roller component in a counter clockwise direction and thereby causing the tires of the vehicle to rotate in a clockwise direction.

11. The method of claim 8, including the step of:
    moving the roller component from a first, unengaged position to a second, engaged position through operation of a hydraulic cylinder.

12. The method of claim 8, including the step of:
    driving the roller component through a chain drive operated by a hydraulic motor so that the roller component rotates and imparts a corresponding rotary force to the tire of the vehicle.

13. The method of claim 12, including the step of varying the speed and direction of the hydraulic motor so that speed and direction of the roller component is adjusted.

14. A vehicle for driving on the road and railroad tracks, comprising:
    a main chassis for supporting a vehicle body and corresponding tires, said tires including portions to be driven on rails of a railroad track;
    a main engine for propelling the vehicle;
    an auxiliary drive suspended below said vehicle body, said auxiliary drive including a hydraulic roller assembly having a roller component for engaging a component of a vehicle to be propelled, a hydraulic cylinder for moving said roller component from a first, unengaged position to a second, engaged position, and a hydraulic motor operatively connected to a chain drive for driving said roller component so that said roller component rotates and imparts a corresponding rotary force to the component of the vehicle.

15. The vehicle of claim 14, wherein said hydraulic motor is powered by said main engine.

16. The vehicle of claim 14, wherein a first end of the drive assembly is attached to said vehicle body and a second end is attached to said hydraulic roller assembly.

17. The vehicle of claim 14, wherein said roller component is a grooved cylindrical drum for engaging rear tires of the vehicle.

18. The vehicle of claim 17, wherein said drum is metal.

19. The vehicle of claim 14, wherein said hydraulic motor is variable so that speed and direction can be adjusted.

20. The vehicle of claim 14, wherein said hydraulic cylinder is disposed between two mounting brackets.

21. The vehicle of claim 14, further comprising a hydraulic flow control valve for controlling said hydraulic cylinder.

22. The vehicle of claim 14, wherein a control box is disposed at a position accessible by an operator of the vehicle.

23. The vehicle of claim 14, further comprising a set of retractable front and rear railroad wheels operatively connected to said main chassis for engaging rails of railroad tracks and for thereby lifting the vehicle front wheels above the rails and permitting the vehicle rear wheels to engage the railroad track rails.

24. An auxiliary drive assembly, comprising:
a hydraulic roller assembly including a roller component for engaging a tire of a vehicle to be propelled;
a hydraulic cylinder for moving said roller component from a first, unengaged position to a second, engaged position; and
a motor operatively connected to said roller component so that said roller component rotates and imparts a corresponding rotary force to the tire of the vehicle; and
wherein said motor is a hydraulic motor and a chain drive extends between and is operatively associated with said hydraulic motor and said roller component so that operation of said hydraulic motor causes corresponding rotation of said roller component.

* * * * *

US007406919C1

(12) INTER PARTES REEXAMINATION CERTIFICATE (519th)
United States Patent
Coots

(10) Number: US 7,406,919 C1
(45) Certificate Issued: Feb. 6, 2013

(54) METHOD AND APPARATUS FOR OPERATING A VEHICLE ON RAILS OF A RAILROAD TRACK WITH AN AUXILIARY DRIVE ASSEMBLY

(75) Inventor: William R. Coots, Lebanon Junction, KY (US)

(73) Assignee: B & B Metals, Inc., Shepherdsville, KY (US)

Reexamination Request:
No. 95/000,558, Jul. 19, 2010

Reexamination Certificate for:
Patent No.: 7,406,919
Issued: Aug. 5, 2008
Appl. No.: 11/264,375
Filed: Nov. 2, 2005

(51) Int. Cl.
*B61F 13/00* (2006.01)
(52) U.S. Cl. .................. 105/215.2; 104/154
(58) Field of Classification Search .............. None
See application file for complete search history.

(56) References Cited

To view the complete listing of prior art documents cited during the proceeding for Reexamination Control Number 95/000,558, please refer to the USPTO's public Patent Application Information Retrieval (PAIR) system under the Display References tab.

*Primary Examiner* — Peter C. English

(57) ABSTRACT

A method and apparatus for operating a vehicle to be driven on the road as well as railroad tracks includes an auxiliary drive suspended below a frame of the vehicle. The auxiliary drive includes a hydraulic roller assembly having a roller component for engaging a tire of a vehicle to be propelled. A hydraulic cylinder extends said roller component from a first, unengaged position to a second, engaged position. A hydraulic motor is operatively connected to a chain drive for driving said roller component so that said roller component rotates and imparts a corresponding rotary force to the tire of the vehicle. In operation, the vehicle is placed in neutral and the auxiliary drive is actuated. The auxiliary drive can be controlled at any location, thereby allowing the vehicle to be driven without a driver.

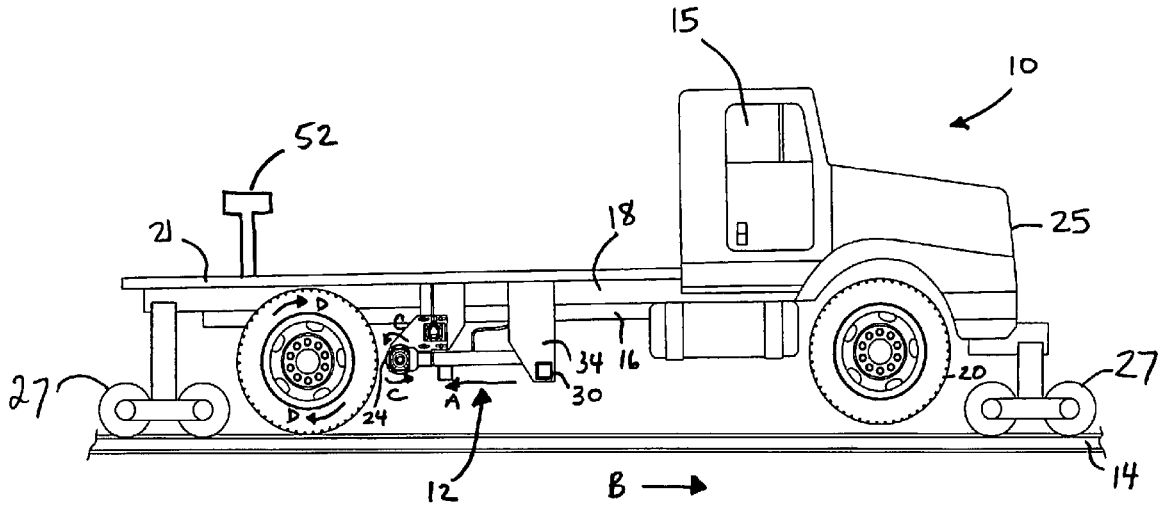

US 7,406,919 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 35-45:

With reference to FIG. 1, a material-handling vehicle 10 for making repairs on railroad tracks is illustrated, which has the capability to operate on both conventional road surfaces as well as the rails of a railroad track. Preferably, the vehicle 10 is driven from an operator's cab 15 when driven over conventional road surfaces to different job sites. The vehicle 10 includes a main chassis 16 for supporting a vehicle body 18, and is provided with front tires 20 and two pair of twin rear tires 22, the rear tires typically driving the vehicle 10. A main vehicle engine powers the vehicle 10, *via a transmission,* and is typically located in the front cab 25 of the vehicle 10.

Column 4, line 63-column 5, line 5:

With reference as in FIG. 1, operation of the auxiliary drive assembly 12 will be discussed in more detail below. In particular, the vehicle 10 is placed on rails of a railroad track so that tires 22 of the vehicle 10 engage the tracks along a portion of the rear tire 23. The vehicle 10 is then placed in neutral. The hydraulic flow control valve 29 is then actuated (shown in FIGS. 4 and 5), which causes the roller component 24 to extend *linearly and horizontally* towards the rear tire 22 in direction A, thereby engaging a rear tire 22 of the vehicle 10. Once the roller component 24 contacts the rear tire 22, the hydraulic motor 46 is actuated.

AS A RESULT OF REEXAMINATION, IT HAS BEEN DETERMINED THAT:

Claims 8 and 24 are cancelled.

Claims 1, 3-5, 7, 9-12, 14, 19 and 20 are determined to be patentable as amended.

Claims 2, 6, 13, 15-18 and 21-23, dependent on an amended claim, are determined to be patentable.

1. An auxiliary drive assembly, comprising:
   a hydraulic roller assembly including a roller component for engaging a *transmission engageable* tire of a vehicle to be propelled;
   *a first mounting bracket and a second mounting bracket extending parallel to an axis of said roller component, first and second slider housings connected to said first and second mounting brackets;*
   *a slider arm disposed within each of said first and second slider housings, said slider arms supporting said roller component;*
   a hydraulic cylinder for moving said roller component from a first, unengaged position to a second, engaged position; and
   a motor operatively connected to said roller component so that said roller component rotates and imparts a corresponding rotary force to the *transmission engageable* tire of the vehicle; [and]
   wherein said motor is a hydraulic motor and is powered by an engine of the vehicle to be propelled.

3. The auxiliary drive assembly of claim 1, wherein said roller component is a grooved cylindrical drum for engaging rear tires of [a] *the* vehicle to be driven.

4. [The auxiliary drive assembly of claim 1.] *An auxiliary drive assembly, comprising:*
   *a hydraulic roller assembly including a roller component for engaging a tire of a vehicle to be propelled;*
   *a first mounting bracket and a second mounting bracket parallel to said first mounting bracket;*
   *slider housings supported by said first and second mounting brackets and extending therebetween;*
   *slider arms positioned within said slider housings and supporting said roller component;*
   *a hydraulic cylinder for moving said roller component linearly and horizontally from a first, unengaged position to a second, engaged position, said hydraulic cylinder extending from said first mounting bracket toward said second mounting bracket and perpendicular to said first and second mounting brackets;*
   *said slider arms and said roller component being moveable with actuation of said hydraulic cylinder; and,*
   *a motor operatively connected to said roller component so that said roller component rotates and imparts a corresponding rotary force to the tire of the vehicle;*
   *wherein said motor is a hydraulic motor and is powered by an engine of the vehicle to be propelled;*
   wherein said hydraulic motor is variable so that speed and direction can be adjusted.

5. [The auxiliary drive assembly of claim 1.] *An auxiliary drive assembly, comprising:*
   *a hydraulic roller assembly including a roller component for engaging a transmission drivable tire of a vehicle to be propelled;*
   *a hydraulic cylinder for linear horizontal movement of said roller component from a first, unengaged position to a second, engaged position;*
   *two mounting brackets supported by said vehicle and having a slider housing connected to said mounting brackets, a slider arm extendable from said slider housing to support said roller component, said hydraulic cylinder capable of movement of said slider arm and said roller component;*
   *a motor operatively connected to said roller component so that said roller component rotates and imparts a corresponding rotary force to the tire of the vehicle;*
   *wherein said motor is a hydraulic motor and is powered by an engine of the vehicle to be propelled;*
   wherein said hydraulic cylinder is disposed between *said* two mounting brackets *and said hydraulic cylinder moves perpendicularly to said two mounting brackets.*

7. [The auxiliary drive assembly of claim 1.] *An auxiliary drive assembly, comprising:*
   *a hydraulic roller assembly including a roller component for engaging a tire of a vehicle to be propelled;*
   *first and second parallel mounting brackets extending from said vehicle, said first and second parallel mounting brackets supporting first and second slider housings and first and second slider arms;* said roller component extending perpendicular to and generally between said slider arms;

a hydraulic cylinder for horizontal linear movement of said roller component from a first, unengaged position to a second, engaged position, said hydraulic cylinder extending horizontally and perpendicular to said first and second mounting brackets; and a motor operatively connected to said roller component so that said roller component rotates and imparts a corresponding rotary force to the tire of the vehicle;

wherein said motor is a hydraulic motor and is powered by an engine of the vehicle to be propelled;

wherein a control unit *used to control the auxiliary drive assembly* is disposed at a position *above a bed of said vehicle and is* accessible by an operator of heavy duty equipment.

9. [The method of claim 8, including the step of:] *A method of operating a vehicle, comprising the steps of:*

*providing an auxiliary drive assembly suspended below a frame of a vehicle to be driven including opposed mounting brackets connected to said vehicle and perpendicular to a hydraulic actuator which moves a roller component to engage a tire of the vehicle, said opposed mounting brackets supporting slider housings, said slider housings receiving slider arms that support said roller component;*

*placing the vehicle on railroad tracks so that tires of the vehicle engage the tracks;*

*extending the roller component linearly and horizontally so that the roller component engages the tire;*

*rotating the roller component so that the roller component imparts a corresponding rotary force to the tire of the vehicle; and,* placing the vehicle in neutral prior to the step of extending the roller component.

10. The method of claim [8] *9*, including the step of rotating the roller component in a counter clockwise direction and thereby causing the tires of the vehicle to rotate in a clockwise direction.

11. The method of claim [8] *9*, including the step of:
moving the roller component from a first, unengaged position to a second, engaged position through operation of a hydraulic cylinder.

12. The method of claim [8] *9*, including the step of:
driving the roller component through a chain drive operated by a hydraulic motor so that the roller component rotates and imparts a corresponding rotary force to the tire of the vehicle.

14. A vehicle for driving on the road and railroad tracks, comprising:

a main chassis for supporting a vehicle body and corresponding tires, said tires including portions to be driven on rails of a railroad track;

a main engine for propelling the vehicle;

an auxiliary drive suspended below said vehicle body, said auxiliary drive including a hydraulic roller assembly having a *first mounting bracket and a second mounting bracket extending parallel to an axis of a roller component, first and second slider housings connected to said* first and second mounting brackets, a slider arm disposed within each of said first and second slider housings, said slider arms supporting said roller component, said roller component for engaging a *transmission drivable* component of a vehicle to be propelled, a hydraulic cylinder for moving said *slider arms and said* roller component from a first, unengaged position to a second, engaged position, and a hydraulic motor operatively connected to a chain drive for driving said roller component so that said roller component rotates and imparts a corresponding rotary force to the *transmission drivable* component of the vehicle.

19. [The vehicle of claim 14.] *A vehicle for driving on the road and railroad tracks, comprising:*

*a main chassis for supporting a vehicle body and corresponding tires, said tires including portions to be driven on rails of a railroad track;*

*a main engine for propelling the vehicle;*

*an auxiliary drive suspended below said vehicle body by a first mounting bracket and a second parallel mounting bracket, said brackets supporting parallel slider housings and slider arms, said auxiliary drive including a hydraulic roller assembly having a roller component supported by said slider arms for engaging a component of a vehicle to be propelled, a hydraulic cylinder for linearly moving said roller component in a horizontal direction from a first, unengaged position to a second, engaged position, said hydraulic cylinder mounted perpendicular to said first and second mounting brackets, and a hydraulic motor operatively connected to a chain drive for driving said roller component so that said roller component rotates and imparts a corresponding rotary force to the component of the vehicle;* wherein said hydraulic motor is variable so that speed and direction can be adjusted.

20. [The vehicle of claim 14.] *A vehicle for driving on the road and railroad tracks, comprising:*

*a main chassis for supporting a vehicle body and corresponding tires, said tires including portions to be driven on rails of a railroad track;*

*a main engine for propelling the vehicle;*

*an auxiliary drive suspended below said vehicle body, said auxiliary drive including a hydraulic roller assembly having a roller component for engaging a transmission drivable component of a vehicle to be propelled, two mounting brackets supporting a slider housing and a slider arm, said slider arm supporting said roller component, a hydraulic cylinder for moving said roller component linearly and horizontally from a first, unengaged position to a second, engaged position, and a hydraulic motor operatively connected to a chain drive for driving said roller component so that said roller component rotates and imparts a corresponding rotary force to the component of the vehicle;* wherein said hydraulic cylinder is disposed between *said* two mounting brackets *and said hydraulic cylinder moves perpendicular to said two mounting brackets.*

\* \* \* \* \*